United States Patent
Wang et al.

(10) Patent No.: US 12,501,318 B2
(45) Date of Patent: Dec. 16, 2025

(54) FLOW CONTROL METHOD AND DEVICE

(71) Applicant: DATANG MOBILE COMMUNICATIONS EQUIPMENT CO., LTD., Beijing (CN)

(72) Inventors: Da Wang, Beijing (CN); Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 439 days.

(21) Appl. No.: 18/004,040

(22) PCT Filed: Jul. 9, 2021

(86) PCT No.: PCT/CN2021/105401
§ 371 (c)(1),
(2) Date: Dec. 30, 2022

(87) PCT Pub. No.: WO2022/007925
PCT Pub. Date: Jan. 13, 2022

(65) Prior Publication Data
US 2023/0276305 A1   Aug. 31, 2023

(30) Foreign Application Priority Data

Jul. 10, 2020   (CN) ......................... 202010665080.8

(51) Int. Cl.
*H04W 28/14* (2009.01)
*H04W 28/12* (2009.01)

(52) U.S. Cl.
CPC .......... *H04W 28/14* (2013.01); *H04W 28/12* (2013.01)

(58) Field of Classification Search
CPC ......... H04W 28/0268; H04W 28/0278; H04W 28/10; H04W 28/12; H04W 28/14;
(Continued)

(56) References Cited

U.S. PATENT DOCUMENTS

2012/0088528 A1* 4/2012 Zhong ..................... H04W 8/04
455/466
2016/0080968 A1* 3/2016 Jeong ................. H04W 28/0236
370/230
(Continued)

FOREIGN PATENT DOCUMENTS

CN   105340317 A   2/2016
CN   106304258 A   1/2017
(Continued)

OTHER PUBLICATIONS

Extended European Search Report for the corresponding European Patent Application No. 21837190.4 issued by the European Patent Office on Oct. 26, 2023.
(Continued)

*Primary Examiner* — Nathan S Taylor
(74) *Attorney, Agent, or Firm* — Ladas & Parry, LLP

(57) ABSTRACT

A flow control method performed by a relay UE for relay forwarding between a first device and a second device includes: generating a flow control message in the case that a flow control condition has been met; and transmitting the flow control message to the first device. The flow control condition includes that relay data cached in the relay UE and transmitted by the first device to the second device exceeds a threshold, or that a flow control request message has been received from the first device.

16 Claims, 5 Drawing Sheets receiving a first flow control message from a relay UE — 61 performing a flow control operation in accordance with the first flow control message — 62

(58) Field of Classification Search
CPC ..... H04W 40/22; H04W 28/02; H04W 64/00;
H04W 52/0229; H04W 52/0235; H04W
68/025; H04W 76/28; H04W 24/10;
H04W 52/0206; H04W 52/0216; H04W
52/0232; H04W 64/006; H04W 8/24;
H04W 52/02; H04W 4/06; H04W 76/40;
H04W 72/1268; H04W 74/0833; H04W
74/0841; H04W 74/0866; H04W 74/08;
H04W 72/12; H04W 56/005; H04W
56/00; H04L 41/0631; H04L 5/0048;
H04L 5/0053; H04L 5/00; H04L 1/0003;
H04L 1/0009; H04L 1/0026; H04L
1/1816; H04L 1/1822; H04L 1/1861;
H04L 12/1868; H04L 2001/0093; H04L
5/0055; H04L 1/18; H04L 43/0864; G01S
13/003; G01S 13/765; G01S 13/767;
G01S 13/87; G01S 13/00; G01S 13/76;
G01S 5/02

See application file for complete search history.

(56) References Cited

U.S. PATENT DOCUMENTS

| | | | |
|---|---|---|---|
| 2018/0054755 A1* | 2/2018 | Lee | H04W 72/21 |
| 2018/0069618 A1* | 3/2018 | Loehr | H04W 72/1263 |
| 2019/0274065 A1* | 9/2019 | Zhao | H04W 24/10 |
| 2021/0116865 A1 | 4/2021 | Rosen et al. | |
| 2021/0168656 A1 | 6/2021 | Li et al. | |
| 2021/0176734 A1* | 6/2021 | You | H04W 40/22 |
| 2022/0286938 A1* | 9/2022 | Wang | H04W 40/34 |
| 2023/0109817 A1* | 4/2023 | Wang | H04W 40/22 |

FOREIGN PATENT DOCUMENTS

| | | |
|---|---|---|
| CN | 106604341 A | 4/2017 |
| CN | 108024286 A | 5/2018 |
| CN | 110856222 A | 2/2020 |
| CN | 112512080 A | 3/2021 |
| EP | 3125643 A1 | 2/2017 |
| WO | 2016184273 A1 | 11/2016 |
| WO | 2020038250 A1 | 2/2020 |

OTHER PUBLICATIONS

International Search Report for PCT Application PCT/CN2021/105401, issued on Sep. 28, 2021 and its English Translation provided by WIPO.
Written Opinion for PCT Application PCT/CN2021/105401, issued on Sep. 28, 2021, and its English Translation provided by WIPO.
International Preliminary Report on Patentability for PCT Application PCT/CN2021/105401, issued on Jan. 10, 2023 and its English Translation provided by WIPO.
"QoS for FeD2D," 3GPP TSG RAN WG2 Meeting #97, R2-1701278, Athens, Greece, Feb. 13-17, 2017, Agenda item: 9.1.3.2, Source: Samsung, Document for: Discussion and Decision, all pages.
Office Action and search report for the corresponding Chinese patent Application No. 202010665080.8 issued Jun. 3, 2023, and its English translation provided by global dossier.

* cited by examiner

FLOW CONTROL METHOD AND DEVICE

CROSS-REFERENCE TO RELATED APPLICATIONS

This application is the U.S. national phase of PCT Application No. PCT/CN2021/105401 filed on Jul. 9, 2021, which claims a priority of the Chinese patent application No. 202010665080.8 filed on Jul. 10, 2020, both of which are incorporated by reference herein.

TECHNICAL FIELD

The present disclosure relates to the field of communication technology, in particular to a flow control method and a flow control device.

BACKGROUND

As shown in FIG. 1, a cellular network communication mode is adopted in conventional radio communication, i.e., uplink/downlink data and/or control information are transmitted between a User Equipment (UE) and a network side device through a Uu interface.

As shown in FIG. 2, Sidelink communication refers to data transmission between adjacent UEs within a short range through Sidelink or PC5. A radio interface corresponding to the Sidelink is called as a Sidelink interface or a PC5 interface.

In order to extend network coverage, a relay has been introduced in the related art, and the relay is a UE having a relay function.

FIG. 3 shows a UE-to-network relay mode. In order to extend the network coverage, one solution lies in the introduction of a relay. The relay is a UE having a relay function. For UE-to-network relay, a Uu interface is used between the relay and the network, and a PC5 interface (also called as Sidelink interface in the protocol) is used between the relay and a relayed UE. A link between the relay and the network is called as backhaul link for the relayed UE.

FIG. 4 shows a UE-to-UE relay mode. For UE-to-UE relay, a Sidelink interface is used between a relay UE and a relayed UE.

For UE-to-network relay, a Uu interface is used between the relay and the network, and a PC5 interface (also called as Sidelink interface in the protocol) is used between the relay and a relayed UE. A link between the relay and the network is called as backhaul link for the relayed UE.

In a scenario where the UE is used as a relay, currently there is no effective scheme about how to achieve flow control for the relay UE.

SUMMARY

An object of the present disclosure is to provide a flow control method and a flow control device, so as to achieve the flow control in the scenario where the UE is used as a relay.

In a first aspect, the present disclosure provides in some embodiments a flow control method for a relay UE for relay forwarding between a first device and a second device, including: generating a flow control message in the case that a flow control condition has been met; and transmitting the flow control message to the first device. The flow control condition includes that relay data cached in the relay UE and transmitted by the first device to the second device exceeds a threshold, or that a flow control request message has been received from the first device.

In a second aspect, the present disclosure provides in some embodiments a flow control method for a first device for transmitting data to a second device via a relay UE, including: receiving a first flow control message from the relay UE; and performing a flow control operation in accordance with the first flow control message. Granularities of the flow control message include one or more of a remote UE, an LCH, an LCG, an RLC channel or a routing path.

In a third aspect, the present disclosure provides in some embodiments a relay UE for relay forwarding between a first device and a second device, including a memory, a processor, a transceiver, and a program instruction stored in the memory and executed by the processor. The processor is configured to execute the program instruction, so as to: generate a flow control message in the case that a flow control condition has been met; and transmit the flow control message to the first device. The flow control condition includes that relay data cached in the relay UE and transmitted by the first device to the second device exceeds a threshold, or that a flow control request message has been received from the first device.

BRIEF DESCRIPTION OF THE DRAWINGS

Through reading the detailed description hereinafter, the other advantages and benefits will be apparent to a person skilled in the art. The drawings are merely used to show the preferred embodiments, but shall not be construed as limiting the present disclosure. In addition, in the drawings, same reference symbols represent same members. In these drawings.

DETAILED DESCRIPTION

Figure 1:
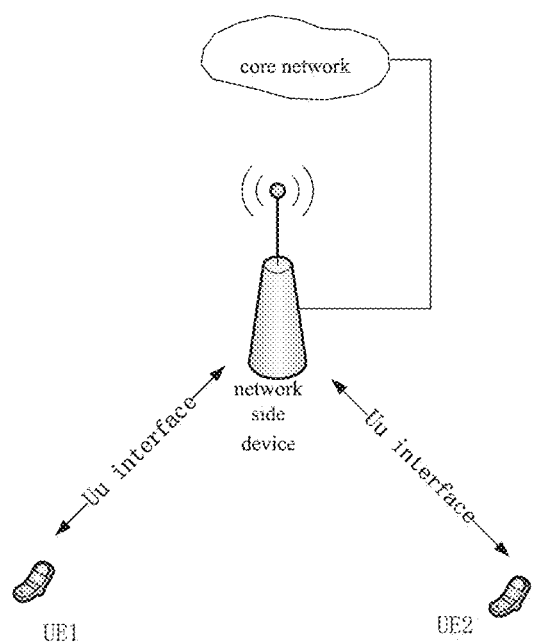
FIG. 1 is a schematic view showing a communication mode of network centralized control in a Long Term Evolution (LTE) system in the related art.
Figure 2:
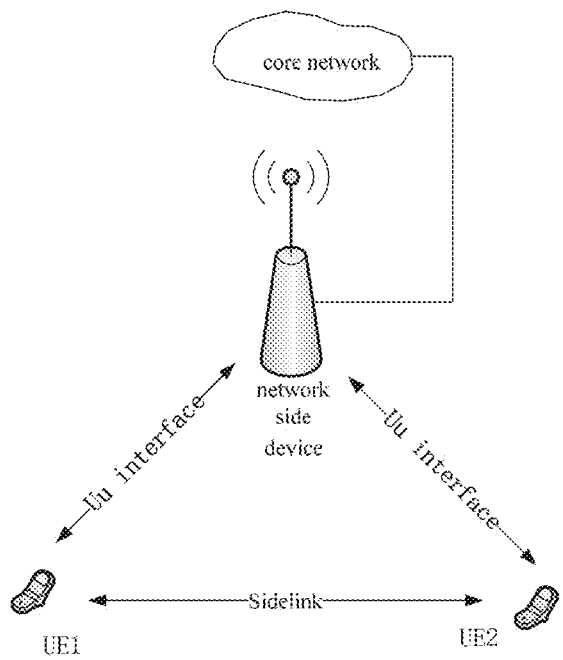
FIG. 2 is a schematic view showing D2D discovery/communication in the related art.

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression "and/or" in the specification and the appended claims is used to represent at least one of listed objects.

The following description is given for illustrative purposes but shall not be construed as limiting the scope, applicability or configuration set forth in the appended claims. Any alterations may be made on functions and arrangements of the discussed elements without departing from the spirit and scope of the present disclosure. Various procedures or assemblies may be omitted, replaced or added appropriately in the examples. For example, steps of the described method may be performed in an order different from that described in the context, and some steps may be added, omitted or combined. In addition, the features described with reference to some examples may be combined in the other examples.

Figure 3:
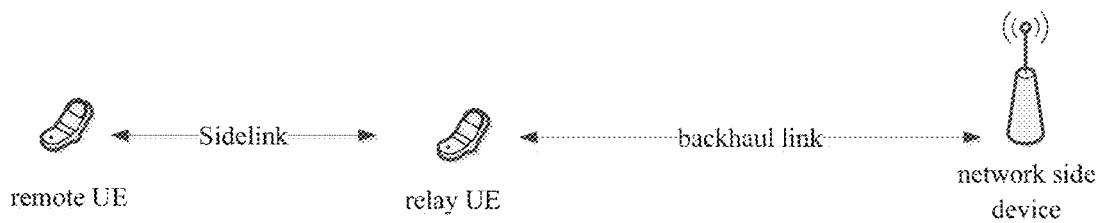
FIG. 3 is a schematic view showing UE-to-network relay in the related art.
Figure 4:
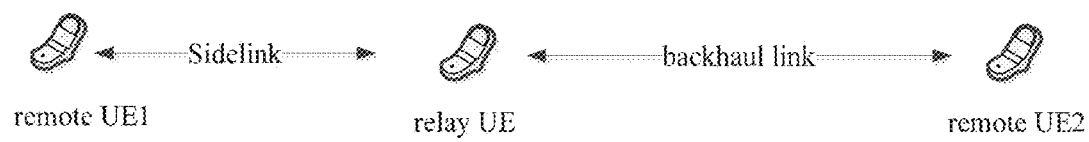
FIG. 4 is a schematic view showing UE-to-UE relay in the related art.

As mentioned in the background, in order to extend the network coverage, a scheme of relay UE as shown in FIGS. 3 and 4 have been introduced in the related art. In a scenario where a UE is used as a relay, currently there is no effective scheme about how to achieve flow control for the relay UE.

In order to solve the above-mentioned problem, the present disclosure provides in some embodiments a flow control method for use in a scenario where a first device communicates with a second device via a relay UE. To be specific, A) the first device is a first remote UE and the second device is a network device, or B) the first device is the network device and the second device is the first remote UE, or C) the first device is a second remote UE and the second device is a third remote UE.

Figure 5:
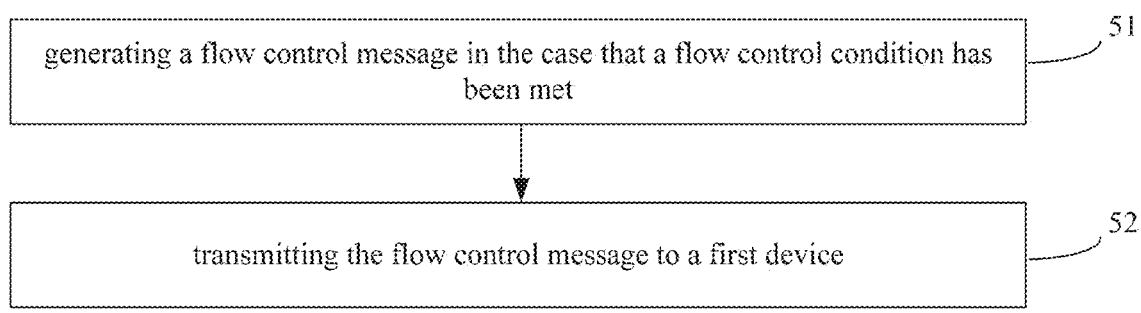
FIG. 5 is a flow chart of a flow control method according to one embodiment of the present disclosure.

As shown in FIG. 5, when the flow control method is used for a relay UE for relay forwarding between the first device and the second device, it includes the following steps.

At block 51, generating a flow control message in the case that a flow control condition has been met.

In the embodiments of the present disclosure, the flow control condition specifically includes any one of the followings.

1) Relay data cached in the relay UE and transmitted by the first device to the second device exceeds a threshold. The threshold may be configured by a network through dedicated RRC signaling or broadcast signaling, or pre-configured in the UE locally, e.g., configured before the UE leaves the factory, etc.

2) A flow control request message has been received from the first device. Here, the flow control request message is used to trigger the relay UE to transmit the flow control message.

At block 52, transmitting the flow control message to the first device.

Through the above-mentioned steps, it is able for the relay UE to perform flow control in accordance with the flow control message generated by the relay UE when the flow control condition has been met, thereby to achieve the flow control in a scenario where the UE is used as a relay.

In the embodiments of the present disclosure, granularities of the flow control message include one or more of a remote UE, an LCH, an LCG, an RLC channel or a routing path, and these units represent the granularities at different granularity levels. There are different granularities at a same granularity level. For example, for the LCG, there are different granularities such as LCG1, LCG2, LCG3 and so forth. In the case of a combination of at least two of the above-mentioned units, especially the granularities include a combination of the remote UE and the LCH, a combination of the remote UE and the LCG, a combination of the remote UE and the RLC channel, etc., and each combination also represents one granularity level. At this time, the flow control message is generated with respect to the granularities corresponding to the combination. Upon the receipt of the flow control message, the first device performs the flow control with respect to the data on the granularities.

In at least one embodiment of the present disclosure, in block 51, the relay UE may generate the flow control message when a data volume of data cached in the relay UE and transmitted by the first device to the second device on the granularity exceeds a corresponding threshold. Here, the granularity is predetermined, e.g., the flow control is performed in accordance with a predetermined granularity between the devices by default. In addition, the granularity is configured through a configuration message (e.g., by a network side device), or indicated through the flow control message. At this time, a specific granularity is explicitly or implicitly indicated in the flow control message.

In at least one embodiment of the present disclosure, the flow control is performed with respect to at least two granularities. The at least two granularities are pre-configured, or configured through a configuration message (e.g., by the network side device), or indicated through the flow control message. For example, the at least two granularities are indicated explicitly or implicitly in the flow control message. At this time, in block 51, the relay UE counts, with respect to the granularities, a data volume of data cached in the relay UE and transmitted by the first device to the second device on each granularity, determines at least one target granularity on which the data volume exceeds a corresponding threshold, and generates the flow control message with respect to the at least one target granularity. The threshold corresponding to each granularity is preconfigured, or configured through a configuration message (e.g., configured by the network side device).

Further, a same granularity, e.g., an LCG, corresponds to at least two different thresholds for generating different flow control messages, and the flow control messages carry different flow control operation indication information, so as to indicate different flow control operations to the first device. For example, the at least two thresholds include a first threshold and a second threshold, and the first threshold is smaller than the second threshold. At this time, in block 51, for example, when the data volume on the granularity is smaller than the second threshold and greater than the first threshold, the flow control message carrying the first threshold and/or first flow control operation indication information corresponding to the first threshold is generated, and when the data volume on the granularity is greater than the second threshold, the flow control message carrying the second threshold and/or second flow control operation indication information corresponding to the second threshold is generated.

To be specific, the first flow control operation indication information is used to indicate that the data transmitted to the second device via the relay UE on the granularity is reduced at a first magnitude. The second flow control operation indication information is used to indicate that the data transmitted to the second device via the relay UE on the granularity is reduced at a second magnitude, or the data is stopped to be transmitted to the second device via the relay UE on the granularity, and the second magnitude is greater than the first magnitude.

In the embodiments of the present disclosure, the thresholds for different granularities are set in accordance with data transmission performance requirement on each granularity. For example, in the case that data transmission performance requirement on a first granularity is lower than data transmission performance requirement on a second granularity in a link between the relay UE and the first device, a threshold corresponding to the first granularity is smaller than a threshold corresponding to the second granularity. In this way, it is able to trigger the flow control operation with respect to the first granularity in an easier manner. To be specific, the data transmission performance requirement includes at least one of a transmission priority level, a transmission delay, or a QoS parameter. It should be appreciated that, the first granularity is the same as, or different from, the second granularity, which will not be particularly defined herein.

In the embodiments of the present disclosure, in the case that the first device is the first remote UE and the second device is the network device, or the first device is the network device and the second device is the first remote UE, the flow control request message carries at least one of an ID of the relay UE, an ID of the first remote UE, a granularity or an ID of the flow control request message, and the flow control message carries at least one of the ID of the relay UE, the ID of the first remote UE, the granularity, a data volume cached in the relay UE on the granularity, or flow control operation indication information.

In the embodiments of the present disclosure, in the case that the first device is the second remote UE and the second device is the third remote UE, the flow control request message carries at least one of an ID of the relay UE, an ID of the second remote UE, an ID of the third remote UE, a granularity or an ID of the flow control request message, and the flow control message carries at least one of the ID of the relay UE, the ID of the second remote UE, the ID of the third remote UE, the granularity, a data volume cached in the relay UE on the granularity, or flow control operation indication information.

Here, the ID of the relay UE specifically refers to a layer2 ID of the relay UE, and the ID of the first, second or third remote UE specifically refers to a layer2 ID of the corresponding remote UE. The ID of the flow control request message represents that the message is used to request the relay UE to transmit the flow control message. In the case that the flow control request message is a Media Access Control (MAC) Control Element (CE), the ID of the flow control request message is specifically a Logic Channel Identity (LCID), and when the flow control request message is RRC signaling, the ID of the flow control request message is specifically an individual piece of indication information. The same goes for the flow control message.

In addition, it should be appreciated that, the flow control message may carry one or more types of the above-mentioned information, or may not carry the above-mentioned information. When the flow control message does not carry the above-mentioned information, the flow control is performed in accordance with a preconfigured default parameter. For example, the relay UE generates the flow control message in accordance with a preconfigured default granularity, and upon the receipt of the flow control message, the first device performs the flow control on the default granularity. The same goes for the other information, which will not be particularly defined herein.

Based on the above, in the embodiments of the present disclosure, the granularity for the flow control is preconfigured, e.g., the flow control is performed between the devices in accordance with a predetermined default granularity, or the granularity is configured through a configuration message (e.g., by the network side device), or the granularity is indicated through a relevant flow control message or a relevant flow control request message, i.e., the granularity is indicated explicitly or implicitly in the message. The flow control request message includes a plurality of granularities at a same level, one or more thresholds are set with respect to each granularity, and different thresholds are used to generate flow control messages indicating different flow control operations. Further, the flow control request message further carries a plurality of granularities at different levels. The relay UE determines each target granularity exceeding a corresponding threshold in accordance with a data volume in a local data buffer area and generates the flow control message with respect to each granularity exceeding the threshold, and the flow control message carries indication information indicating the target granularity, so as to indicate the first device to perform the flow control operation with respect to each target granularity.

The flow control method has been described hereinabove from a relay UE side, and it will be further described hereinafter from a first device side.

Figure 6:
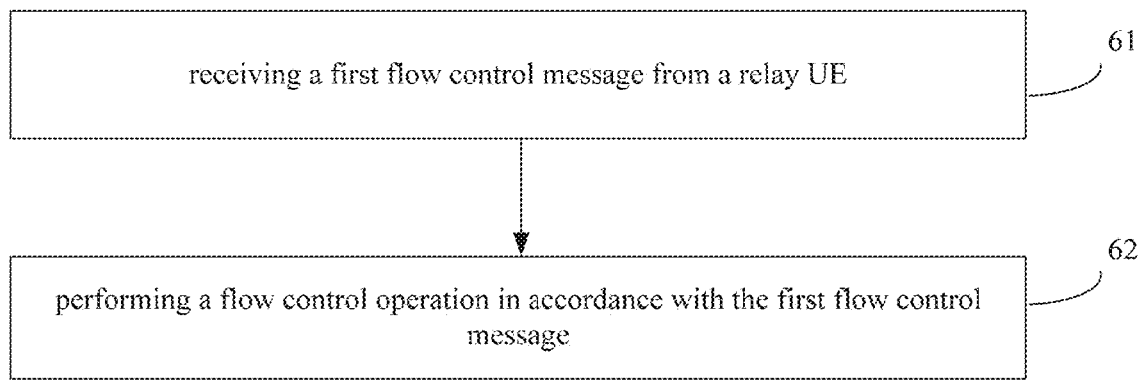
FIG. 6 is another flow chart of the flow control method according to one embodiment of the present disclosure.

As shown in FIG. 6, the present disclosure provides in some embodiments a flow control method for a first device for transmitting data to a second device via a relay UE. The first device is a first remote UE and the second device is a network device, or the first device is the network device and the second device is the first remote UE, or the first device is a second remote UE and the second device is a third remote UE. As shown in FIG. 6, the flow control method includes the following steps.

at block 61, receiving a first flow control message from the relay UE.

Here, granularities of the flow control message include one or more of a remote UE, an LCH, an LCG, an RLC channel or a routing path. When no specific granularity is indicated in the flow control message, the processing is performed in accordance with a default granularity.

at block 62, performing a flow control operation in accordance with the first flow control message.

Here, the flow control operation includes at least one of the followings.

1) Reducing a data volume transmitted to the second transmission via the relay UE on the granularity. Here, a reduction magnitude is a preconfigured default magnitude, or a magnitude determined by the first device itself.
2) Reducing a data volume transmitted to the second device via the relay UE on the granularity in accordance with a magnitude indicated through the first flow control message. Here, the magnitude is specifically indicated through the first flow control message.
3) Stopping the transmission of data to the second device via the relay UE on the granularity. At this time, the first device reselects another relay UE for the relay forwarding of the data between the first device and the second device.

Through the above-mentioned steps, the flow control is performed in accordance with the flow control message from the relay UE, so as to achieve the flow control in a scenario where a UE is used as a relay.

The first flow control message carries therein the flow control operation indication information to indicate a specific flow control operation. At this time, the first device performs the corresponding flow control operation in accordance with the flow control operation indication information carried in the first flow control message. When no specific flow control operation is indicated in the first flow control message, the first device performs the processing in accordance with a default flow control operation. The default flow control operation may include one or more of the above-mentioned operations.

Furthermore, in order to ensure the data transmission reliability, in block 62, the first device at first determines whether data transmission performance requirement on the granularity has been met after reducing the data volume transmitted to the second device via the relay UE on the granularity, when a determination result is yes, reduces the data volume transmitted to the second device via the relay UE on the granularity, and when the determination result is no, reselects another relay UE to transmit the data to the second device through relay reselection.

In addition, in the embodiments of the present disclosure, the first flow control message carries at least one granularity. At this time, in block 62, when performing the flow control operation in accordance with the first flow control message, the first device further performs the flow control operation on each granularity of the at least one granularity.

In some possible embodiments of the present disclosure, prior to block 61, the first device further transmits a flow control request message to the relay UE, and the flow control request message is used to request the relay UE to transmit the flow control message.

Similarly, in the embodiments of the present disclosure, in the case that the first device is the first remote UE and the second device is the network device, or the first device is the network device and the second device is the first remote UE, the flow control request message carries therein at least one of an ID of the relay UE, an ID of the first remote UE, a granularity or an ID of the flow control request message, and the flow control message carries at least one of the ID of the relay UE, the ID of the first remote UE, the granularity, a data volume cached in the relay UE on the granularity, or flow control operation indication information.

In the embodiments of the present disclosure, in the case that the first device is the second remote UE and the second device is the third remote UE, the flow control request message carries at least one of an ID of the relay UE, an ID of the second remote UE, an ID of the third remote UE, a granularity or an ID of the flow control request message, and the flow control message carries at least one of the ID of the relay UE, the ID of the second remote UE, the ID of the third remote UE, the granularity, a data volume cached in the relay UE on the granularity, or flow control operation indication information.

Here, the ID of the relay UE specifically refers to a layer2 ID of the relay UE, and the ID of the first, second or third remote UE specifically refers to a layer2 ID of the corresponding remote UE. The ID of the flow control request message represents that the message is used to request the relay UE to transmit the flow control message.

After performing the flow control operation in accordance with the first flow control message, the data volume in the data buffer of the relay UE is not reduced obviously, so the relay UE may probably continue to transmit an additional flow control message, e.g., a second flow control message. At this time, the first device further receives the second flow control message from the relay UE, and performs the flow control operation in accordance with the second flow control message.

In order to understand the above contents in a better manner, the following description will be given with respect to the granularities in various scenarios.

First Scenario: UE-to-Network Relay

1. For an uplink service where a data service is transmitted by a remote UE to a network via a relay UE, when a buffer size of the relay UE is greater than a first threshold or the relay UE has received the flow control request message from the remote UE, the relay UE transmits the flow control message to the remote UE.

Here, the first threshold is configured by a network device, or preconfigured locally, e.g., configured when the device is shipped.

In some possible embodiments of the present disclosure, a plurality of thresholds may also be configured or preconfigured, e.g., a first threshold a<a first threshold b<a first threshold c. When the buffer size is greater than the first threshold a, the relay UE transmits a flow control message a to the remote UE; when the buffer size is greater than the first threshold b, the relay UE transmits a flow control message b to the remote UE; and when the buffer size is greater than the first threshold c, the relay UE transmits a flow control message c to the remote UE.

Here, the flow control request message is used to request the relay UE to transmit the flow control message, and it includes at least one of a relay UE ID, a remote UE ID, a request message ID, or a granularity of the flow control message (the request message ID is used to represent that the message is used to request the relay UE to transmit the flow control message). The granularity of the flow control message includes one of a remote UE, an LCG, an LCH, an RLC channel or a routing path.

The granularities will be described hereinafter.

A) When the granularity of the flow control message is the remote UE, the relay UE counts, in unit of the remote UE ID, whether a data volume in a local data buffer transmitted through the remote UE ID exceeds the first threshold, and when the data volume is greater than the first threshold, the relay UE transmits the flow control message to the remote UE. The flow control message includes at least one of the relay UE ID, the remote UE ID, or the buffer size occupied by the transmitted data. Upon the receipt of the flow control message, the remote UE reduces the data volume transmitted to the relay UE or performs relay reselection.

For example, the remote UE may reduce the data volume transmitted to the relay UE at first, and when it still receives the flow control message from the relay UE, it means that a congestion level of the relay UE is not relieved. At this time, the remote UE may further reduce the data volume transmitted to the relay UE or stop transmitting the data volume to the relay UE, or perform the relay reselection, i.e., reselect another relay for the data transmission.

For another example, when the remote UE reduces the data volume transmitted to the relay UE without any influence on QoS parameters for transmitting the service by the remote UE (e.g., delay, rate, etc.), the remote UE may reduce the data volume transmitted to the relay UE. When the remote UE reduces the data volume transmitted to the relay UE with influences on the QoS parameters for transmitting the service by the remote UE (e.g., delay, rate, etc.), the remote UE may perform relay reselection, i.e., reselect another relay for the data transmission, so as to ensure the QoS parameters of the service.

For yet another example, when a plurality of thresholds is configured or preconfigured, the remote UE may reduce the data volume transmitted to the relay UE or perform relay reselection in accordance with the different flow control messages. For example, upon the receipt of the flow control message a, the remote UE may reduce the data volume transmitted to the relay UE; upon the receipt of the flow control message b, the remote UE may further reduce the data volume transmitted to the relay UE; and upon the receipt of the flow control message c, the remote UE may further reduce the data volume transmitted to the relay UE or stop transmitting the data volume to the relay UE, or perform relay reselection.

> B) When the granularity of the flow control message is the LCG, the relay UE counts, in unit of the LCG ID, whether a data volume in the buffer transmitted through the LCG ID exceeds the first threshold. There may exist a plurality of LCGs for a link between the relay UE and the remote UE, and the counting operation is performed with respect to each LCG. When the data volume is greater than the first threshold, the relay UE transmits the flow control message to the remote UE. The flow control message includes at least one of the relay UE ID, the remote UE ID, the LCG ID, or the buffer size occupied by the data transmitted through the LCG ID. When the data volume transmitted through more than one LCG exceeds the first threshold, the flow control message may include a plurality of LCG IDs and the buffer size occupied by the data corresponding to each LCG ID.

In some possible embodiments of the present disclosure, different first thresholds may be configured or preconfigured in accordance with different priority levels of the LCGs, different transmission delays or different QoS parameters. Taking the priority levels as an example, when a priority level of LCG1 is higher than that of LCG2, a first threshold A is configured for LCG1 and a first threshold B is configured for LCG2, and the first threshold A is greater than the first threshold B, so that the relay UE preferentially receives more data transmitted on the LCG with a higher priority level, rather than transmitting the flow control message on the LCG with the higher priority level.

Upon the receipt of the flow control message, the remote UE may reduce the data volume transmitted to the relay UE on the LCG, or perform relay reselection, like the above-mentioned scheme where the granularity is the remote UE.

Alternatively, when the flow control message includes a plurality of LCG IDs, the remote UE may reduce the data volume transmitted to the relay UE on the LCG in accordance with the priority level of the LCG, the transmission delay or the QoS parameters. For example, when the flow control message includes LCG ID1 and LCG ID2 and a priority level of LCG1 is higher than that of LCG2, the remote UE may reduce the data volume transmitted on LCG2, so as to ensure that the data is transmitted preferentially on LCG1. Alternatively, the remote UE may reduce the data volume transmitted on LCG2 to a greater extent and reduce the data volume transmitted on LCG1 to a smaller extent.

> C) When the granularity of the flow control message is the LCH, the relay UE counts, in unit of the LCID, whether a data volume in the buffer transmitted through the LCID exceeds the first threshold. There may exist a plurality of LCHs for a link between the relay UE and the remote UE, and the counting operation is performed with respect to each LCH. When the data volume is greater than the first threshold, the relay UE transmits the flow control message to the remote UE. The flow control message includes at least one of the relay UE ID, the remote UE ID, the LCID, or the buffer size occupied by the data transmitted through the LCID. When the data volume transmitted through more than one LCH exceeds the first threshold, the flow control message may include a plurality of LCIDs and the buffer size occupied by the data corresponding to each LCID.

In some possible embodiments of the present disclosure, different first thresholds may be configured or preconfigured in accordance with different priority levels of the LCHs, different transmission delays or different QoS parameters. Taking the priority levels as an example, when a priority level of LCH1 is higher than that of LCH2, a first threshold A is configured for LCH1 and a first threshold B is configured for LCH2, and the first threshold A is greater than the first threshold B, so that the relay UE preferentially receives more data transmitted on the LCH with a higher priority level, rather than transmitting the flow control message on the LCH with the higher priority level.

Upon the receipt of the flow control message, the remote UE reduces the data volume transmitted to the relay UE on the LCH, or performs relay reselection, like the above-mentioned scheme where the granularity is the remote UE. Alternatively, when there is a plurality of LCIDs in the flow control message, the remote UE reduces the data volume transmitted to the relay UE on the LCH in accordance with the priority level of the LCG, the transmission delay or the QoS parameters, like the above-mentioned scheme where the granularity is the LCG.

> D) When the granularity of the flow control message is the RLC channel, the relay UE counts, in unit of RLC channel ID, whether a data volume in the buffer transmitted through the RLC channel ID exceeds the first threshold. There may exist a plurality of RLC channels for a link between the relay UE and the remote UE, and the counting operation is performed with respect to each RLC channel. When the data volume is greater than the first threshold, the relay UE transmits the flow control message to the remote UE. The flow control message includes at least one of the relay UE ID, the remote UE ID, the RLC channel ID, or the buffer size occupied by the data transmitted through the RLC channel ID. When the data volume transmitted through more than one RLC channel exceeds the first threshold, the flow control message may include a plurality of RLC channel IDs and the buffer size occupied by the data corresponding to each RLC channel.

In some possible embodiments of the present disclosure, different first thresholds may be configured or preconfigured in accordance with different priority levels of the RLC channels, different transmission delays or different QoS parameters. Taking the priority levels as an example, when a priority level of RLC channel1 is higher than that of RLC channel2, a first threshold A is configured for RLC channel1 and a first threshold B is configured for RLC channel2, and the first threshold A is greater than the first threshold B, so that the relay UE preferentially receives more data transmitted on the RLC channel with a higher priority level, rather than transmitting the flow control message on the RLC channel with the higher priority level.

Upon the receipt of the flow control message, the remote UE reduces the data volume transmitted to the relay UE on the RLC channel, or performs relay reselection, like the above-mentioned scheme where the granularity is the remote UE. Alternatively, when there is a plurality of RLC channel IDs in the flow control message, the remote UE reduces the data volume transmitted to the relay UE on the RLC channel in accordance with the priority level of the RLC channel, the transmission delay or the QoS parameters, like the above-mentioned scheme where the granularity is the LCG.

E) When the granularity of the flow control message is the routing path, the relay UE counts, in unit of routing path ID, whether a data volume in the buffer transmitted through the routing path ID exceeds the first threshold. For example, the remote UE is connected to a network through a plurality of relays in a multi-hop manner, and there are various paths to access the network, e.g., for path1, the remote UE is connected to the network through relay1 and relay2, and for path2, the remote UE is connected to the network through relay3 and relay2. The counting operation is performed with respect to each routing path. When the data volume is greater than the first threshold, the relay UE transmits the flow control message to the remote UE. The flow control message includes at least one of the relay UE ID, the remote UE ID, the routing path ID, or the buffer size occupied by the data transmitted through the routing path. When the data volume transmitted through more than one routing path exceeds the first threshold, the flow control message may include a plurality of routing path IDs and the buffer size occupied by the data corresponding to each routing path.

In some possible embodiments of the present disclosure, different first thresholds may be configured or preconfigured in accordance with different priority levels of the routing path channels, different transmission delays or different QoS parameters. Taking the priority levels as an example, when a priority level of routing path1 is higher than that of routing path2, a first threshold A is configured for routing path1 and a first threshold B is configured for routing path2, and the first threshold A is greater than the first threshold B, so that the relay UE preferentially receives more data transmitted on the routing path with a higher priority level, rather than transmitting the flow control message on the routing path with the higher priority level.

Upon the receipt of the flow control message, the remote UE reduces the data volume transmitted to the relay UE on the routing path, or performs relay reselection, like the above-mentioned scheme where the granularity is the remote UE. Alternatively, when there is a plurality of routing path IDs in the flow control message, the remote UE reduces the data volume transmitted to the relay UE on the routing path in accordance with the priority level of the routing path, the transmission delay or the QoS parameters, like the above-mentioned scheme where the granularity is the LCG.

When the granularity of the flow control message is a combination of the above-mentioned granularities, e.g., a combination of remote UE+LCG, a combination of remote UE+LCH or a combination of remote UE+RLC channel, a scheme design is similar to that mentioned hereinabove. For example, the remote UE counts, in unit of remote UE+LCG, whether a data volume in the buffer transmitted through the remote UE ID and the LCG ID exceeds the first threshold, which will not be particularly defined herein.

2. For a Downlink Service Where a Data Service is Transmitted by a Relay UE to a Remote UE When a buffer size of the relay UE is greater than a second threshold or the relay UE has received the flow control request message from the network device, the relay UE transmits the flow control message to the network device.

Here, the second threshold is configured by the network device, or preconfigured locally.

In some possible embodiments of the present disclosure, a plurality of thresholds may also be configured or preconfigured, e.g., a second threshold a<a second threshold b<a second threshold c. When the buffer size is greater than the second threshold a, the relay UE transmits a flow control message a to the network device; when the buffer size is greater than the second threshold b, the relay UE transmits a flow control message b to the network device; and when the buffer size is greater than the second threshold c, the relay UE transmits a flow control message c to the network device.

Specifically, the flow control request message is used to request the relay UE to transmit the flow control message, and it includes at least one of a relay UE ID, a remote UE ID, a request message ID, or a granularity of the flow control message (the request message ID is used to represent that the message is used to request the relay UE to transmit the flow control message).

Here, the granularity of the flow control message includes one of a remote UE, an LCG, an LCH, an RLC channel or a routing path.

A) When the granularity of the flow control message is the remote UE, the relay UE counts, in unit of the remote UE ID, whether a data volume in a buffer transmitted through the remote UE ID exceeds the second threshold. The network device may establish the connection with a plurality of remote UEs through the relay UE, i.e., there is a plurality of remote UEs which accesses the network device through one relay UE, so the relay UE needs to count the data transmitted to each remote UE. When the data volume is greater than the second threshold, the relay UE transmits the flow control message to the network device.

Here, the flow control message includes at least one of the relay UE ID, the remote UE ID, or the buffer size occupied by the data transmitted to the remote UE.

When the data volume transmitted to more than one remote UE through the relay UE exceeds the second threshold, the flow control message may include a plurality of remote UE IDs, and a buffer size occupied by the data corresponding to each remote UE ID.

In some possible embodiments of the present disclosure, different second thresholds may be configured or preconfigured in accordance with different priority levels of the remote UEs, different transmission delays or different QoS parameters. Taking the priority levels as an example, when a priority level of remote UE1 is higher than that of remote UE2, a first threshold A is configured for remote UE1 and a first threshold B is configured for remote UE2, and the first threshold A is greater than the first threshold B, so that the relay UE preferentially receives more data transmitted to the remote UE with a higher priority level, rather than transmitting the flow control message with respect to the remote UE with the higher priority level.

Upon the receipt of the flow control message, the network device may reduce the data volume transmitted to the remote UE through the relay UE, or indicate the remote UE to perform relay reselection.

For example, the network device may reduce the data volume transmitted to the remote UE through the relay UE at first, and when it still receives the flow control message from the relay UE, it means that a congestion level of the relay UE is not relieved. At this time, the network device may indicate the remote UE to perform relay reselection, i.e., indicate the remote UE to reselect another relay for the data transmission.

For another example, when the network device reduces the data volume transmitted to the remote UE through the relay UE without any influence on QoS parameters for transmitting the service (e.g., delay, rate, etc.), the network device may reduce the data volume transmitted to the remote UE through the relay UE. When the network device reduces the data volume transmitted to the remote UE through the relay UE with influences on the QoS parameters for transmitting the service (e.g., delay, rate, etc.), the network device may indicate the remote UE to perform relay reselection, i.e., indicate the remote UE to reselect another relay for the data transmission, so as to ensure the QoS parameters of the service.

For yet another example, when the flow control message includes a plurality of remote UE IDs, the network device may reduce the data volume transmitted to the remote UE through the relay UE in accordance with the priority levels of the remote UEs, the transmission delay or the QoS parameters. For example, when the flow control message includes remote UE ID1 and remote UE ID2 and a priority level of remote UE1 is higher than that of remote UE2, the network device may reduce the data volume transmitted to remote UE2 through the relay UE, so as to ensure that the data is transmitted preferentially to remote UE1. Alternatively, the network device may reduce the data volume transmitted to remote UE2 through the relay UE to a greater extent and reduce the data volume transmitted to remote UE1 through the relay UE to a smaller extent.

For still yet another example, when a plurality of thresholds is configured or preconfigured, the network device may reduce the data volume transmitted to the remote UE through the relay UE or indicate the remote UE to perform relay reselection in accordance with the different flow control messages. For example, upon the receipt of the flow control message a, the network device may reduce the data volume transmitted to the remote UE through the relay UE; upon the receipt of the flow control message b, the network device may further reduce the data volume transmitted to the remote UE through the relay UE; and upon the receipt of the flow control message c, the network device may further reduce the data volume transmitted to the remote UE through the relay UE or stop transmitting the data volume to the remote UE through the relay UE, or indicate the remote UE to perform relay reselection.

B) When the granularity of the flow control message is the LCG, the network device counts, in unit of the LCG ID, whether a data volume in the buffer transmitted through the LCG ID exceeds the second threshold. There may exist a plurality of LCGs for a link between the relay UE and the network device, and the counting operation is performed with respect to each LCG. When the data volume is greater than the second threshold, the relay UE transmits the flow control message to the network device.

The flow control message includes at least one of the relay UE ID, the remote UE ID, the LCG ID, or the buffer size occupied by the data transmitted through the LCG ID.

When the data volume transmitted through more than one LCG exceeds the second threshold, the flow control message may include a plurality of LCG IDs and the buffer size occupied by the data corresponding to each LCG ID.

In some possible embodiments of the present disclosure, different second thresholds may be configured or preconfigured in accordance with different priority levels of the LCGs, different transmission delays or different QoS parameters. Taking the priority levels as an example, when a priority level of LCG1 is higher than that of LCG2, a second threshold A is configured for LCG1 and a second threshold B is configured for LCG2, and the second threshold A is greater than the second threshold B, so that the relay UE preferentially receives more data transmitted on the LCG with a higher priority level, rather than transmitting the flow control message on the LCG with the higher priority level.

Upon the receipt of the flow control message, the network device may reduce the data volume transmitted to the remote UE through the relay UE, or indicate the remote UE to perform relay reselection, like the above-mentioned scheme where the granularity is the remote UE.

C) When the granularity of the flow control message is the LCH, the RLC channel or the routing path, a specific scheme is similar to that about the flow control message whose granularity is the LCG, which will not be particularly defined herein.

D) When the granularity of the flow control message is a combination of the above-mentioned granularities, e.g., a combination of remote UE+LCG, a combination of remote UE+LCH or a combination of remote UE+RLC channel, a scheme design is similar to that mentioned hereinabove. For example, the network device counts, in unit of remote UE+LCG, whether a data volume in the buffer transmitted through the remote UE ID and the LCG ID exceeds the second threshold, which will not be particularly defined herein.

Second Scenario: UE-to-UE Relay

The data is transmitted from one remote UE (remote UE1) to another remote UE (remote UE2), so there is no uplink or downlink transmission. As compared with the above-mentioned UE-to-network relay, the following description will be given.

The description will be given when the data is transmitted by remote UE1 to remote UE2 through the relay UE. A scheme where the data is transmitted by remote UE2 to remote UE1 through the relay UE is similar (a main difference lies in that the relay UE transmits the flow control message to remote UE2 when the buffer size of the relay UE is greater than a fourth threshold or when the relay UE has received a request message from remote UE2).

When the buffer size of the relay UE is greater than a third threshold or when the relay UE has received the flow control request message from remote UE1, the relay UE transmits the flow control message to remote UE1.

Here, the third threshold is configured by the network device, or preconfigured locally.

In some possible embodiments of the present disclosure, a plurality of thresholds may also be configured or preconfigured, e.g., a third threshold a<a third threshold b<a third threshold c. When the buffer size is greater than the third threshold a, the relay UE transmits a flow control message a to remote UE1; when the buffer size is greater than the third threshold b, the relay UE transmits a flow control message b to remote UE1; and when the buffer size is greater than the third threshold c, the relay UE transmits a flow control message c to remote UE1.

The flow control request message is used to request the relay UE to transmit the flow control message, and it includes at least one of a relay UE ID, a remote UE1 ID, a remote UE2 ID, a request message ID, or a granularity of the flow control message (the request message ID is used to represent that the message is used to request the relay UE to transmit the flow control message).

Here, the granularity of the flow control message includes one of a remote UE, an LCG, an LCH, an RLC channel or a routing path.

When the granularity of the flow control message is the remote UE, the relay UE counts, in unit of remote UE ID, whether the data volume in the buffer transmitted to the remote UE ID exceeds the third threshold. Remote UE1 may probably establish the connection with a plurality of remote UE2s through the relay UE, and it may transmit the data to the plurality of remote UE2s through one relay UE, so the relay UE needs to count the data transmitted to each remote UE2. When the data volume is greater than the third threshold, the relay UE transmits the flow control message to the remote UE1.

The flow control message includes at least one of the relay UE ID, the remote UE1 ID, the remote UE2 ID, or the buffer size occupied by the data transmitted to remote UE2.

When the data volume transmitted to more than one remote UE2 through the relay UE exceeds the third threshold, the flow control message may include a plurality of remote UE2 IDs, and a buffer size occupied by data corresponding to each remote UE2 ID.

In some possible embodiments of the present disclosure, different third thresholds may be configured or preconfigured in accordance with different priority levels of the remote UEs, different transmission delays or different QoS parameters. Taking the priority levels as an example, when a priority level of remote UE2A is higher than that of remote UE2B, a third threshold A is configured for remote UE2A and a third threshold B is configured for remote UE2B, and the third threshold A is greater than the third threshold B, so that the relay UE preferentially receives more data transmitted to the remote UE with a higher priority level, rather than transmitting the flow control message with respect to the remote UE with the higher priority level.

Upon the receipt of the flow control message, remote UE1 reduces the data volume transmitted to remote UE2 through the relay UE, or performs relay reselection.

For example, remote UE1 may reduce the data volume transmitted to remote UE2 through the relay UE at first, and when it still receives the flow control message from the relay UE, it means that a congestion level of the relay UE is not relieved. At this time, remote UE1 may perform relay reselection, i.e., reselect another relay for the data transmission.

For another example, when remote UE1 reduces the data volume transmitted to remote UE2 through the relay UE without any influence on QoS parameters for transmitting the service (e.g., delay, rate, etc.), remote UE1 may reduce the data volume transmitted to remote UE2 through the relay UE. When remote UE1 reduces the data volume transmitted to remote UE2 through the relay UE with influences on the QoS parameters for transmitting the service (e.g., delay, rate, etc.), the remote UE1 may perform relay reselection, i.e., reselect another relay for the data transmission, so as to ensure the QoS parameters of the service.

For yet another example, when the flow control message includes a plurality of remote UE2 IDs, remote UE1 may reduce the data volume transmitted to remote UE2 through the relay UE in accordance with the priority levels of remote UE2s, the transmission delay or the QoS parameters. For example, when the flow control message includes remote UE2A ID and remote UE2B ID and a priority level of remote UE2A is higher than that of remote UE2B, the remote UE1 may reduce the data volume transmitted to remote UE2B through the relay UE, so as to ensure that the data is transmitted preferentially to remote UE2A. Alternatively, the remote UE1 may reduce the data volume transmitted to remote UE2B through the relay UE to a greater extent and reduce the data volume transmitted to remote UE2A through the relay UE to a smaller extent.

For still yet another example, when a plurality of thresholds is configured or preconfigured, remote UE1 may reduce the data volume transmitted to remote UE2 through the relay UE or indicate remote UE1 to perform relay reselection in accordance with the different flow control messages. For example, upon the receipt of the flow control message a, remote UE1 may reduce the data volume transmitted to remote UE2 through the relay UE; upon the receipt of the flow control message b, remote UE1 may further reduce the data volume transmitted to remote UE2 through the relay UE; and upon the receipt of the flow control message c, remote UE1 may further reduce the data volume transmitted to remote UE2 through the relay UE or stop transmitting the data volume to remote UE2 through the relay UE, or perform relay reselection.

When the granularity of the flow control message is the LCG, the relay UE counts, in unit of LCG ID, whether the data volume in the buffer transmitted through the LCG ID exceeds the third threshold. There may exist a plurality of LCGs for a link between the relay UE and remote UE1, and the counting operation may be performed with respect to each LCG. When the data volume is greater than the third threshold, the relay UE may transmit the flow control message to remote UE1.

The flow control message includes at least one of the relay UE ID, the remote UE1 ID, the remote UE2 ID, the LCG ID, or a buffer size occupied by the data corresponding to the LCG ID.

When the data volume transmitted through more than one LCG exceeds the third threshold, the flow control message may include a plurality of LCG IDs, and a buffer size occupied by the data corresponding to each LCG ID.

In some possible embodiments of the present disclosure, different third thresholds may be configured or preconfigured in accordance with different priority levels of the LCGs, different transmission delays or different QoS parameters. Taking the priority levels as an example, when a priority level of LCG1 is higher than that of LCG2, a third threshold A is configured for LCG1 and a third threshold B is configured for LCG2, and the third threshold A is greater than the third threshold B, so that the relay UE preferentially receives more data transmitted on the LCG with a higher priority level, rather than transmitting the flow control message on the LCG with the higher priority level.

Upon the receipt of the flow control message, remote UE1 may reduce the data volume transmitted to remote UE2 through the relay UE, or perform relay reselection, like the above-mentioned scheme where the granularity is the remote UE.

When the granularity of the flow control message is the LCH, the RLC channel or the routing path, a specific scheme is similar to that about the flow control message whose granularity is the LCG, which will not be particularly defined herein.

When the granularity of the flow control message is a combination of the above-mentioned granularities, e.g., a combination of remote UE+LCG, a combination of remote UE+LCH or a combination of remote UE+RLC channel, a scheme design is similar to that mentioned hereinabove. For example, remote UE1 counts, in unit of remote UE+LCG, whether a data volume in the buffer transmitted through the remote UE ID and the LCG ID exceeds the third or fourth threshold, which will not be particularly defined herein.

The following description will be given in conjunction with some specific interaction examples.

First Example: UE-to-Network Relay Uplink Service Transmission

A specific process will be described as follows.

Step S101: the relay UE receives the data transmitted by the remote UE to the network device, and forwards it to the network device.

Step S102: the relay UE detects that the buffer size of the relay UE is greater than the first threshold, or the relay UE has received the flow control request message from the remote UE.

Here, the first threshold is configured by the network device, or preconfigured. The flow control request message is used to request the relay UE to transmit the flow control message, and it includes at least one of the relay UE ID, the remote UE ID, the flow control request message ID or the granularity of the flow control message.

Step S103: the relay UE transits the flow control message to the remote UE.

The granularity of the flow control message includes one of the remote UE, the LCG, the LCH, the RLC channel or the routing path. Processing modes with respect to different granularities are the same as those mentioned hereinabove.

Step S104: upon the receipt of the flow control message, the remote UE reduces the data volume transmitted to the relay UE, or performs relay reselection. Details of this step may refer to those mentioned hereinabove.

Second Example: UE-to-Network Relay Downlink Service Transmission

A specific process will be described as follows.

Step S201: the relay UE receives the data transmitted by the network device to the remote UE, and forwards it to the remote UE.

Step S202: the relay UE detects that the buffer size is greater than the second threshold or the relay UE has received the flow control request message from the network device.

Here, the second threshold is configured by the network device, or preconfigured. The flow control request message is used to request the relay UE to transmit the flow control message, and it includes at least one of the relay UE ID, the remote UE ID, the flow control request message ID or the granularity of the flow control message.

Step S203: the relay UE transmits the flow control message to the network device.

The granularity of the flow control message includes one of the remote UE, the LCG, the LCH, the RLC channel or the routing path. Processing modes with respect to different granularities are the same as those mentioned hereinabove.

Step S204: upon the receipt of the flow control message, the network device reduces the data volume transmitted to the remote UE through the relay UE, or indicates the remote UE to perform relay reselection. Details of this step may refer to those mentioned hereinabove.

Third Example: UE-to-UE Relay

The following description will be given when the data is transmitted by remote UE1 to remote UE2 through the relay UE.

A specific process will be described as follows.

Step S301: the relay UE receives the data transmitted by remote UE1 to remote UE2, and forwards it to remote UE2.

Step S302: the relay UE detects that the buffer size is greater than the third threshold, or the relay UE has received the flow control request message from remote UE1.

Here, the third threshold is configured by the network device, or preconfigured. The flow control request message is used to request the relay UE to transmit the flow control message, and it includes at least one of the relay UE ID, the remote UE1 ID, the remote UE2 ID, the flow control request message ID or the granularity of the flow control message.

Step S303: the relay UE transmits the flow control message to remote UE1.

The granularity of the flow control message includes one of the remote UE, the LCG, the LCH, the RLC channel or the routing path. Processing modes with respect to different granularities are the same as those mentioned hereinabove.

Step S304: upon the receipt of the flow control message, remote UE1 reduces the data volume transmitted to remote UE2 through the relay UE, or performs relay reselection. Details of this step may refer to those mentioned hereinabove.

The flow control methods have been described hereinabove, and devices for implementing the methods will be further described hereinafter.

Figure 7:
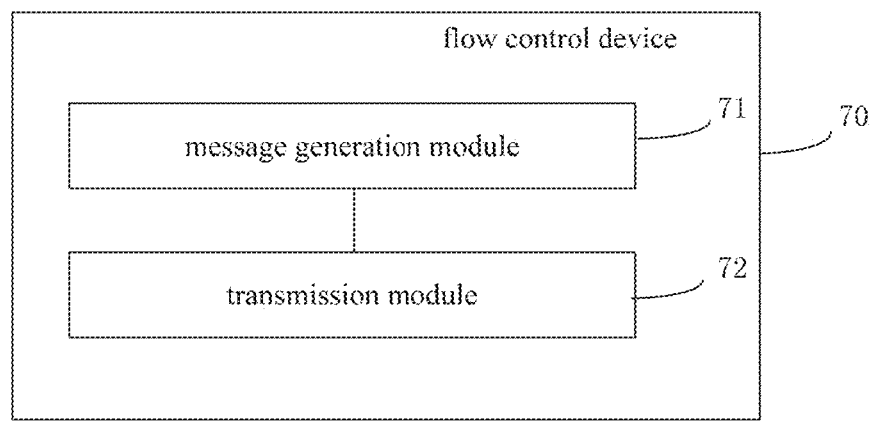
FIG. 7 is a block diagram of a flow control device according to one embodiment of the present disclosure.

As shown in FIG. 7, the present disclosure provides in some embodiments a flow control device 70 for a relay UE for relay forwarding between a first device and a second device, which includes: a message generation module 71 configured to generate a flow control message in the case that a flow control condition has been met; and a transmission module 72 configured to transmit the flow control message to the first device. The flow control condition includes that relay data cached in the relay UE and transmitted by the first device to the second device exceeds a threshold, or that a flow control request message has been received from the first device.

According to the embodiments of the present disclosure, the relay UE generates and transmits the flow control message when the flow control condition has been met, so as to enable the first device to perform the flow control operation, thereby to achieve the flow control in a scenario where the UE is used as a relay.

In some possible embodiments of the present disclosure, the first device is a first remote UE and the second device is a network device, or the first device is the network device and the second device is the first remote UE, or the first device is a second remote UE and the second device is a third remote UE.

In some possible embodiments of the present disclosure, granularities of the flow control message include one or more of a remote UE, an LCH, an LCG, an RLC channel or a routing path.

In some possible embodiments of the present disclosure, the message generation module 71 is further configured to generate the flow control message in the case that a data volume of data cached in the relay UE and transmitted by the first device to the second device on the granularity exceeds a corresponding threshold.

In some possible embodiments of the present disclosure, the message generation module 71 is further configured to: with respect to the granularities, count a data volume of data cached in the relay UE and transmitted by the first device to the second device on each granularity, and determine at least one target granularity on which the data volume exceeds a corresponding threshold; and generate the flow control message with respect to the at least one target granularity.

In some possible embodiments of the present disclosure, a same granularity corresponds to at least two different thresholds, the at least two different thresholds include a first threshold and a second threshold, and the first threshold is smaller than the second threshold. The message generation module 71 is further configured to: in the case that the data volume on the granularity is smaller than the second threshold and greater than the first threshold, generate the flow control message carrying the first threshold and/or first flow control operation indication information corresponding to the first threshold; and in the case that the data volume on the granularity is greater than the second threshold, generate the flow control message carrying the second threshold and/or second flow control operation indication information corresponding to the second threshold.

In some possible embodiments of the present disclosure, the first flow control operation indication information is used to indicate that the data transmitted to the second device via the relay UE on the granularity is reduced at a first magnitude; and the second flow control operation indication information is used to indicate that the data transmitted to the second device via the relay UE on the granularity is reduced at a second magnitude, or the data is stopped to be transmitted to the second device via the relay UE on the granularity, and the second magnitude is greater than the first magnitude.

In some possible embodiments of the present disclosure, in the case that data transmission performance requirement on a first granularity is lower than data transmission performance requirement on a second granularity in a link between the relay UE and the first device, a threshold corresponding to the first granularity is smaller than a threshold corresponding to the second granularity, and the data transmission performance requirement includes at least one of a transmission priority level, a transmission delay, or a QoS parameter.

In some possible embodiments of the present disclosure, in the case that the first device is the first remote UE and the second device is the network device, or the first device is the network device and the second device is the first remote UE, the flow control request message carries at least one of an ID of the relay UE, an ID of the first remote UE, a granularity or an ID of the flow control request message, and the flow control message carries at least one of the ID of the relay UE, the ID of the first remote UE, the granularity, a data volume cached in the relay UE on the granularity, or flow control operation indication information. In the case that the flow control request message carries the granularity, the relay UE further determines the granularity of the flow control message in accordance with the granularity carried in the flow control request message.

In some possible embodiments of the present disclosure, in the case that the first device is the second remote UE and the second device is the third remote UE, the flow control request message carries at least one of an ID of the relay UE, an ID of the second remote UE, an ID of the third remote UE, a granularity or an ID of the flow control request message, and the flow control message carries at least one of the ID of the relay UE, the ID of the second remote UE, the ID of the third remote UE, the granularity, a data volume cached in the relay UE on the granularity, or flow control operation indication information. In the case that the flow control request message carries the granularity, the relay UE further determines the granularity of the flow control message in accordance with the granularity carried in the flow control request message.

It should be appreciated that, the flow control device in the embodiments of the present disclosure corresponds to the method in FIG. 5, and the implementation of the flow control device may refer to that of the flow control method with a same technical effect. The flow control device is used to implement all the steps of the flow control method with a same technical effect, which will not be particularly defined herein.

Figure 8:
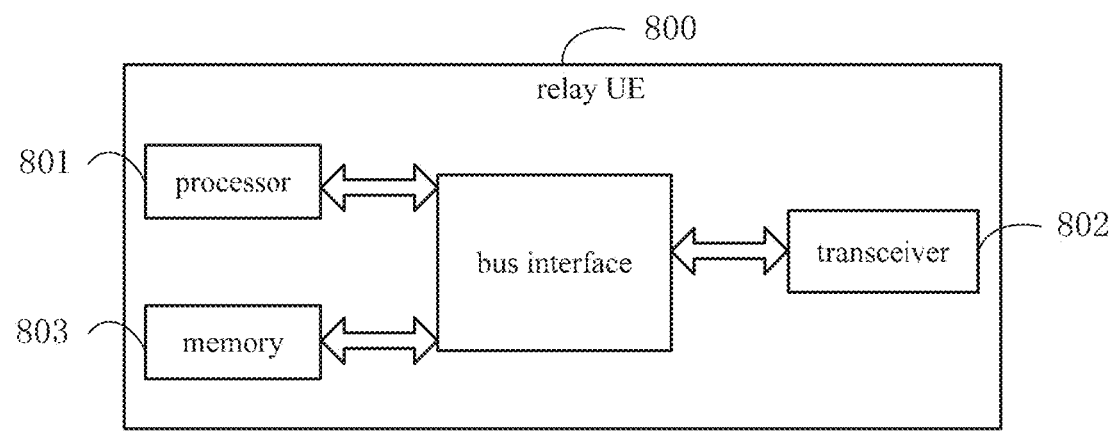
FIG. 8 is a schematic view showing a relay UE according to one embodiment of the present disclosure.

As shown in FIG. 8, the present disclosure provides in some embodiments a relay UE 800 for relay forwarding between a first device and a second device, which includes a processor 801, a transceiver 802, a memory 803 and a bus interface. The relay UE 800 further includes a program instruction stored in the memory 803 and executed by the processor 801. The program instruction is executed by the processor 801, so as to: generate a flow control message in the case that a flow control condition has been met; and transmit the flow control message to the first device. The flow control condition includes that relay data cached in the relay UE and transmitted by the first device to the second device exceeds a threshold, or that a flow control request message has been received from the first device.

In some possible embodiments of the present disclosure, the first device is a first remote UE and the second device is a network device, or the first device is the network device and the second device is the first remote UE, or the first device is a second remote UE and the second device is a third remote UE.

In some possible embodiments of the present disclosure, granularities of the flow control message include one or more of a remote UE, an LCH, an LCG, an RLC channel or a routing path.

In some possible embodiments of the present disclosure, the processor is configured to execute the program instruction, so as to generate the flow control message in the case that a data volume of data cached in the relay UE and transmitted by the first device to the second device on the granularity exceeds a corresponding threshold.

In some possible embodiments of the present disclosure, the processor is configured to execute the program instruction, so as to: with respect to the granularities, count a data volume of data cached in the relay UE and transmitted by the first device to the second device on each granularity, and determine at least one target granularity on which the data volume exceeds a corresponding threshold; and generate the flow control message with respect to the at least one target granularity.

In some possible embodiments of the present disclosure, a same granularity corresponds to at least two different thresholds, the at least two different thresholds include a first threshold and a second threshold, and the first threshold is smaller than the second threshold. The processor is configured to execute the program instruction, so as to: in the case that the data volume on the granularity is smaller than the second threshold and greater than the first threshold, generate the flow control message carrying the first threshold and/or first flow control operation indication information corresponding to the first threshold; and in the case that the data volume on the granularity is greater than the second threshold, generate the flow control message carrying the second threshold and/or second flow control operation indication information corresponding to the second threshold.

In some possible embodiments of the present disclosure, the first flow control operation indication information is used to indicate that the data transmitted to the second device via the relay UE on the granularity is reduced at a first magnitude; and the second flow control operation indication information is used to indicate that the data transmitted to the second device via the relay UE on the granularity is reduced at a second magnitude, or the data is stopped to be transmitted to the second device via the relay UE on the granularity, and the second magnitude is greater than the first magnitude.

In some possible embodiments of the present disclosure, in the case that data transmission performance requirement on a first granularity is lower than data transmission performance requirement on a second granularity in a link between the relay UE and the first device, a threshold corresponding to the first granularity is smaller than a threshold corresponding to the second granularity, and the data transmission performance requirement includes at least one of a transmission priority level, a transmission delay, or a QoS parameter.

In some possible embodiments of the present disclosure, in the case that the first device is the first remote UE and the second device is the network device, or the first device is the network device and the second device is the first remote UE, the flow control request message carries at least one of an ID of the relay UE, an ID of the first remote UE, a granularity or an ID of the flow control request message, and the flow control message carries at least one of the ID of the relay UE, the ID of the first remote UE, the granularity, a data volume cached in the relay UE on the granularity, or flow control operation indication information. In the case that the flow control request message carries the granularity, the relay UE further determines the granularity of the flow control message in accordance with the granularity carried in the flow control request message.

In some possible embodiments of the present disclosure, in the case that the first device is the second remote UE and the second device is the third remote UE, the flow control request message carries at least one of an ID of the relay UE, an ID of the second remote UE, an ID of the third remote UE, a granularity or an ID of the flow control request message, and the flow control message carries at least one of the ID of the relay UE, the ID of the second remote UE, the ID of the third remote UE, the granularity, a data volume cached in the relay UE on the granularity, or flow control operation indication information. In the case that the flow control request message carries the granularity, the relay UE further determines the granularity of the flow control message in accordance with the granularity carried in the flow control request message.

In FIG. 8, bus architecture may include a number of buses and bridges connected to each other, so as to connect various circuits for one or more processors 801 and one or more memories 803. In addition, as is known in the art, the bus architecture may be used to connect any other circuits, such as a circuit for a peripheral device, a circuit for a voltage stabilizer and a power management circuit. A bus interface may be provided, and the transceiver 802 may consist of a plurality of elements, i.e., a transmitter and a receiver for communication with any other devices over a transmission medium.

The processor 801 may take charge of managing the bus architecture as well as general processings. The memory 803 may store therein data for the operation of the processor 801.

It should be appreciated that, the relay UE in the embodiments of the present disclosure corresponds to the flow control method in FIG. 5, and the implementation of the relay UE may refer to that of the flow control method with a same technical effect. In the relay UE, the transceiver 802 is in communication with the memory 803 and the processor 801 via a bus interface. A function of the processor 801 may also be achieved through the transceiver 802, and a function of the transceiver 802 may also be achieved through the processor 801. It should be appreciated that, the relay UE is used to implement all the steps in the above-mentioned flow control method with a same technical effect, which will not be particularly defined herein.

The present disclosure further provides in some embodiments a computer-readable storage medium storing therein a program instruction. The program instruction is executed by a processor, so as to: generate a flow control message in the case that a flow control condition has been met; and transmit the flow control message to the first device. The flow control condition includes that relay data cached in the relay UE and transmitted by the first device to the second device exceeds a threshold, or that a flow control request message has been received from the first device.

The program instruction is executed by the processor so as to implement the above-mentioned flow control method for the relay UE with a same technical effect, which will not be particularly defined herein.

Figure 9:
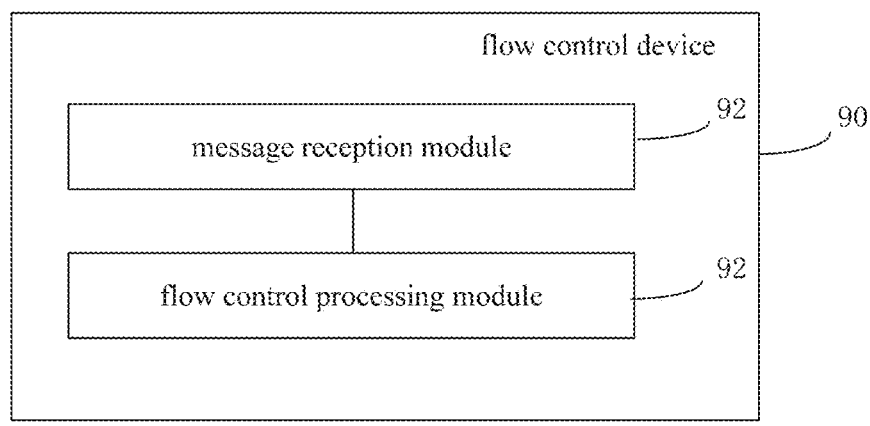
FIG. 9 is another block diagram of the flow control device according to one embodiment of the present disclosure.

As shown in FIG. 9, the present disclosure further provides in some embodiments a flow control device 90 for a first device for transmitting data to a second device via a relay UE, which includes: a message reception module 91 configured to receive a first flow control message from the relay UE; and a flow control processing module 92 configured to perform a flow control operation in accordance with the first flow control message. Granularities of the flow control message include one or more of a remote UE, an LCH, an LCG, an RLC channel or a routing path.

According to the embodiments of the present disclosure, the flow control is performed in accordance with the flow control message from the relay UE, so as to achieve the flow control in a scenario where a UE is used as a relay.

In some possible embodiments of the present disclosure, the first device is a first remote UE and the second device is a network device, or the first device is the network device and the second device is the first remote UE, or the first device is a second remote UE and the second device is a third remote UE.

In some possible embodiments of the present disclosure, the flow control device further includes a message transmission module configured to, prior to receiving the first flow control message from the relay UE, transmit a flow control request message to the relay UE, and the flow control request message is used to request the relay UE to transmit flow control message.

In some possible embodiments of the present disclosure, the flow control operation includes at least one of reducing a data volume transmitted to the second transmission via the relay UE on the granularity, reducing a data volume transmitted to the second device via the relay UE on the granularity in accordance with a magnitude indicated through the first flow control message, or stopping the transmission of data to the second device via the relay UE on the granularity.

In some possible embodiments of the present disclosure, the flow control processing module 92 is further configured to perform a corresponding flow control operation in accordance with flow control operation indication information carried in the first flow control message.

In some possible embodiments of the present disclosure, the flow control processing module 92 is further configured to: determine whether data transmission performance requirement on the granularity has been met after reducing the data volume transmitted to the second device via the relay UE on the granularity; when a determination result is yes, reduce the data volume transmitted to the second device via the relay UE on the granularity; and when the determination result is no, reselect another relay UE to transmit the data to the second device through relay reselection.

In some possible embodiments of the present disclosure, the flow control processing module 92 is further configured to, subsequent to performing the flow control operation in accordance with the first flow control message, receive a second flow control message from the relay UE; and performing the flow control operation in accordance with the second flow control message.

In some possible embodiments of the present disclosure, the first flow control message carries at least one granularity. The flow control processing module 92 is further configured to, when performing the flowing control operation in accordance with the first flow control message, perform the flow control operation on each granularity of the at least one granularity.

In some possible embodiments of the present disclosure, in the case that the first device is the first remote UE and the second device is the network device, or the first device is the network device and the second device is the first remote UE, the flow control request message carries at least one of an ID of the relay UE, an ID of the first remote UE, a granularity or an ID of the flow control request message, and the flow control message carries at least one of the ID of the relay UE, the ID of the first remote UE, the granularity, a data volume cached in the relay UE on the granularity, or flow control operation indication information. In the case that the flow control request message carries the granularity, the relay UE further determines the granularity of the flow control message in accordance with the granularity carried in the flow control request message.

In some possible embodiments of the present disclosure, in the case that the first device is the second remote UE and the second device is the third remote UE, the flow control request message carries at least one of an ID of the relay UE, an ID of the second remote UE, an ID of the third remote UE, a granularity or an ID of the flow control request message, and the flow control message carries at least one of the ID of the relay UE, the ID of the second remote UE, the ID of the third remote UE, the granularity, a data volume cached in the relay UE on the granularity, or flow control operation indication information. In the case that the flow control request message carries the granularity, the relay UE further determines the granularity of the flow control message in accordance with the granularity carried in the flow control request message.

It should be appreciated that, the flow control device in the embodiments of the present disclosure corresponds to the method in FIG. 6, and the implementation of the flow control device may refer to that of the flow control method with a same technical effect. The flow control device is used to implement all the steps of the flow control method with a same technical effect, which will not be particularly defined herein.

Figure 10:
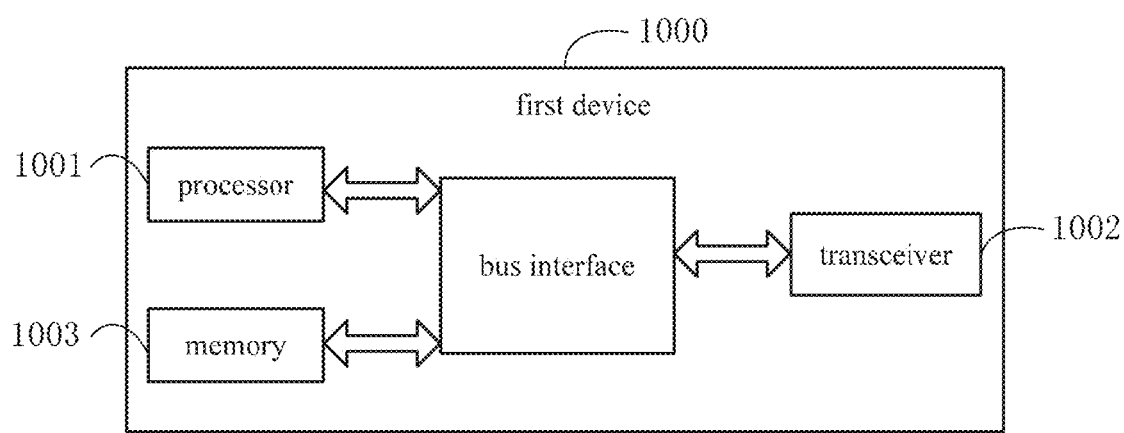
FIG. 10 is a schematic view showing a first device according to one embodiment of the present disclosure.

As shown in FIG. 10, the present disclosure provides in some embodiments a first device 1000 for transmitting data to a second device through a relay UE, which includes a processor 1001, a transceiver 1002, a memory 1003 and a bus interface. The first device 1000 further includes a program instruction stored in the memory 1003 and executed by the processor 1001. The program instruction is executed by the processor 1001, so as to: receive a first flow control message from the relay UE; and perform a flow control operation in accordance with the first flow control message. Granularities of the flow control message include one or more of a remote UE, an LCH, an LCG, an RLC channel or a routing path.

In some possible embodiments of the present disclosure, the first device is a first remote UE and the second device is a network device, or the first device is the network device and the second device is the first remote UE, or the first device is a second remote UE and the second device is a third remote UE.

In some possible embodiments of the present disclosure, the processor is further configured to execute the program instruction so as to transmit a flow control request message to the relay UE, and the flow control request message is used to request the relay UE to transmit flow control message.

In some possible embodiments of the present disclosure, the flow control operation includes at least one of reducing a data volume transmitted to the second transmission via the relay UE on the granularity, reducing a data volume transmitted to the second device via the relay UE on the granularity in accordance with a magnitude indicated through the first flow control message, or stopping the transmission of data to the second device via the relay UE on the granularity.

In some possible embodiments of the present disclosure, the processor is further configured to execute the program instruction so as to perform a corresponding flow control operation in accordance with flow control operation indication information carried in the first flow control message.

In some possible embodiments of the present disclosure, the processor is further configured to execute the program instruction so as to: determine whether data transmission performance requirement on the granularity has been met after reducing the data volume transmitted to the second device via the relay UE on the granularity; when a determination result is yes, reduce the data volume transmitted to the second device via the relay UE on the granularity; and when the determination result is no, reselect another relay UE to transmit the data to the second device through relay reselection.

In some possible embodiments of the present disclosure, the processor is further configured to execute the program instruction so as to: receive a second flow control message from the relay UE; and perform the flow control operation in accordance with the second flow control message.

In some possible embodiments of the present disclosure, the first flow control message carries at least one granularity, and the processor is further configured to execute the program instruction so as to, when performing the flowing control operation in accordance with the first flow control message, perform the flow control operation on each granularity of the at least one granularity.

In some possible embodiments of the present disclosure, in the case that the first device is the first remote UE and the second device is the network device, or the first device is the network device and the second device is the first remote UE, the flow control request message carries at least one of an ID of the relay UE, an ID of the first remote UE, a granularity or an ID of the flow control request message, and the flow control message carries at least one of the ID of the relay UE, the ID of the first remote UE, the granularity, a data volume cached in the relay UE on the granularity, or flow control operation indication information. In the case that the flow control request message carries the granularity, the relay UE further determines the granularity of the flow control message in accordance with the granularity carried in the flow control request message.

In some possible embodiments of the present disclosure, in the case that the first device is the second remote UE and the second device is the third remote UE, the flow control request message carries at least one of an ID of the relay UE, an ID of the second remote UE, an ID of the third remote UE, a granularity or an ID of the flow control request message, and the flow control message carries at least one of the ID of the relay UE, the ID of the second remote UE, the ID of the third remote UE, the granularity, a data volume cached in the relay UE on the granularity, or flow control operation indication information. In the case that the flow control request message carries the granularity, the relay UE further determines the granularity of the flow control message in accordance with the granularity carried in the flow control request message.

In FIG. 10, bus architecture may include a number of buses and bridges connected to each other, so as to connect various circuits for one or more processors 1001 and one or more memories 1003. In addition, as is known in the art, the bus architecture may be used to connect any other circuits, such as a circuit for a peripheral device, a circuit for a voltage stabilizer and a power management circuit. A bus interface may be provided, and the transceiver 1002 may consist of a plurality of elements, i.e., a transmitter and a receiver for communication with any other devices over a transmission medium.

The processor 1001 may take charge of managing the bus architecture as well as general processings. The memory 1003 may store therein data for the operation of the processor 1001.

It should be appreciated that, the first device in the embodiments of the present disclosure corresponds to the flow control method in FIG. 6, and the implementation of the first device may refer to that of the flow control method with a same technical effect. In the first device, the transceiver 1002 is in communication with the memory 1003 and the processor 1001 via a bus interface. A function of the processor 1001 may also be achieved through the transceiver 1002, and a function of the transceiver 1002 may also be achieved through the processor 1001. It should be appreciated that, the first device is used to implement all the steps in the above-mentioned flow control method with a same technical effect, which will not be particularly defined herein.

The present disclosure further provides in some embodiments a computer-readable storage medium storing therein a program instruction. The program instruction is executed by a processor, so as to: receive a first flow control message from the relay UE; and perform a flow control operation in accordance with the first flow control message. Granularities of the flow control message include one or more of a remote UE, an LCH, an LCG, an RLC channel or a routing path.

The program instruction is executed by the processor so as to implement the above-mentioned flow control method for the first device with a same technical effect, which will not be particularly defined herein.

According to the embodiments of the present disclosure, a scheme for performing flow control in accordance with the flow control message generated by the relay UE when the flow control condition has been met is provided, so as to achieve the flow control in a scenario where the UE is used as a relay. In addition, relevant parameters are carried in the flow control request message and/or the flow control message, so as to perform different flow control operations with respect to different granularities.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A flow control method performed by a relay User Equipment (UE) for relay forwarding between a first device and a second device, comprising:
   generating a flow control message when a flow control condition has been met; and transmitting the flow control message to the first device,
wherein the flow control condition comprises that relay data cached in the relay UE and transmitted by the first device to the second device exceeds a threshold, or that a flow control request message has been received from the first device,
wherein when the first device is the first remote UE and the second device is the network device, the flow control request message carries therein at least one of: (i) an Identity (ID) of the relay UE, (ii) an ID of the first remote UE, (iii) a granularity, or (iv) an ID of the flow control request message, and the flow control message carries therein at least one of: (u) the ID of the relay UE, (uu) the ID of the first remote UE, (uuu) the granularity, (uv) a data volume cached in the relay UE on the granularity, or (v) flow control operation indication information, wherein when the flow control request message carries therein the granularity, the relay UE further determines the granularity of the flow control message in accordance with the granularity carried in the flow control request message; or,
wherein when the first device is the network device and the second device is the first remote UE, the flow control request message carries therein at least one of: (i) an ID of the relay UE, (ii) an ID of the first remote UE, (iii) a granularity, or (iv) an ID of the flow control request message, and the flow control message carries therein at least one of: (u) the ID of the relay UE, (uu) the ID of the first remote UE, (uuu) the granularity, (uv) a data volume cached in the relay UE on the granularity, or (v) flow control operation indication information, wherein when the flow control request message carries therein the granularity, the relay UE further determines the granularity of the flow control message in accordance with the granularity carried in the flow control request message; or,
wherein when the first device is the second remote UE and the second device is a third remote UE, the flow control request message carries therein at least one of: (i) an ID of the relay UE, (ii) an ID of the second remote UE, (iii) an ID of the third remote UE, (iv) a granularity, or (v) an ID of the flow control request message, and the flow control message carries therein at least one of: (u) the ID of the relay UE, (uu) the ID of the second remote UE, (uuu) the ID of the third remote UE, (uv) the granularity, (v) a data volume cached in the relay UE on the granularity, or (vu) flow control operation indication information, wherein when the flow control request message carries therein the granularity, the relay UE further determines the granularity of the flow control message in accordance with the granularity carried in the flow control request message.

2. The flow control method according to claim 1, wherein granularities of the flow control message comprise one or more of a remote UE, a Logical Channel (LCH), a Logical Channel Group (LCG), a Radio Resource Control (RLC) channel or a routing path.

3. The flow control method according to claim 2, wherein when the flow control condition is that the relay data cached in the relay UE and transmitted by the first device to the second device exceeds the threshold, the generating the flow control message comprises generating the flow control message when a data volume of data cached in the relay UE and transmitted by the first device to the second device on the granularity exceeds a corresponding threshold.

4. The flow control method according to claim 3, wherein when the flow control condition is that the relay data cached in the relay UE and transmitted by the first device to the second device exceeds the threshold, the generating the flow control message comprises:
with respect to the granularities, counting a data volume of data cached in the relay UE and transmitted by the first device to the second device on each granularity, and determining at least one target granularity on which the data volume exceeds a corresponding threshold; and
generating the flow control message with respect to the at least one target granularity.

5. The flow control method according to claim 3, wherein a same granularity corresponds to at least two different thresholds, the at least two different thresholds comprise a first threshold and a second threshold, and the first threshold is smaller than the second threshold, wherein the generating the flow control message further comprises:
when the data volume on the granularity is smaller than the second threshold and greater than the first threshold, generating the flow control message carrying one or more of following information: (i) the first threshold, (ii) first flow control operation indication information corresponding to the first threshold, or (iii) the first threshold and the first flow control operation indication information corresponding to the first threshold; or
when the data volume on the granularity is greater than the second threshold, generating the flow control message carrying one or more of following information: (u) the second threshold and/or, (uu) second flow control operation indication information corresponding to the second threshold, or (uuu) the second threshold and the second flow control operation indication information corresponding to the second threshold.

6. The flow control method according to claim 5, wherein the first flow control operation indication information is used to indicate that the data transmitted to the second device via the relay UE on the granularity is reduced at a first magnitude;
the second flow control operation indication information is used to indicate that the data transmitted to the second device via the relay UE on the granularity is reduced at a second magnitude, or the data is stopped to be transmitted to the second device via the relay UE on the granularity, and the second magnitude is greater than the first magnitude.

7. The flow control method according to claim 3, wherein when data transmission performance requirement on a first granularity is lower than data transmission performance requirement on a second granularity in a link between the relay UE and the first device, a threshold corresponding to the first granularity is smaller than a threshold corresponding to the second granularity, and the data transmission performance requirement comprises at least one of a transmission priority level, a transmission delay, or a Quality of Service (QOS) parameter.

8. A flow control method performed by a first device for transmitting data to a second device via a relay User Equipment (UE), comprising:
receiving a first flow control message from the relay UE; and
performing a flow control operation in accordance with the first flow control message,
wherein granularities of the flow control message comprise one or more of a remote UE, a Logical Channel (LCH), a Logical Channel Group (LCG), a Radio Resource Control (RLC) channel or a routing path, wherein when the first device is the first remote UE and the second device is the network device, the flow control request message carries therein at least one of: (i) an Identity (ID) of the relay UE, (ii) an ID of the first remote UE, (iii) a granularity, or (iv) an ID of the flow control request message, and the flow control message carries therein at least one of: (u) the ID of the relay UE, (uu) the ID of the first remote UE, (uuu) the granularity, (uv) a data volume cached in the relay UE on the granularity, or (v) flow control operation indication information, wherein when the flow control request message carries therein the granularity, the relay UE further determines the granularity of the flow control message in accordance with the granularity carried in the flow control request message; or, wherein when the first device is the network device and the second device is the first remote UE, the flow control request message carries therein at least one of: (i) an ID of the relay UE, (ii) an ID of the first remote UE, (iii) a granularity, or (iv) an ID of the flow control request message, and the flow control message carries therein at least one of: (u) the ID of the relay UE, (uu) the ID of the first remote UE, (uuu) the granularity, (uv) a data volume cached in the relay UE on the granularity, or (v) flow control operation indication information, wherein when the flow control request message carries therein the granularity, the relay UE further determines the granularity of the flow control message in accordance with the granularity carried in the flow control request message; or, wherein when the first device is the second remote UE and the second device is a third remote UE, the flow control request message carries therein at least one of: (i) an ID of the relay UE, (ii) an ID of the second remote UE, (iii) an ID of the third remote UE, (iv) a granularity, or (v) an ID of the flow control request message, and the flow control message carries therein at least one of: (u) the ID of the relay UE, (uu) the ID of the second remote UE, (uuu) the ID of the third remote UE, (uv) the granularity, (v) a data volume cached in the relay UE on the granularity, or (vu) flow control operation indication information, wherein when the flow control request message carries therein the granularity, the relay UE further determines the granularity of the flow control message in accordance with the granularity carried in the flow control request message.

9. The flow control method according to claim 8, wherein prior to receiving the first flow control message from the relay UE, the flow control method further comprises transmitting a flow control request message to the relay UE, and the flow control request message is used to request the relay UE to transmit flow control message.

10. The flow control method according to claim 8, wherein the flow control operation comprises at least one of reducing a data volume transmitted to the second transmission via the relay UE on the granularity, reducing a data volume transmitted to the second device via the relay UE on the granularity in accordance with a magnitude indicated through the first flow control message, or stopping the transmission of data to the second device via the relay UE on the granularity.

11. The flow control method according to claim 8, wherein the performing the flow control operation in accordance with the first flow control message comprises performing a corresponding flow control operation in accordance with flow control operation indication information carried in the first flow control message; or wherein the performing the flow control operation in accordance with the first flow control message comprises:
determining whether data transmission performance requirement on the granularity has been met after reducing the data volume transmitted to the second device via the relay UE on the granularity;
when a determination result is yes, reducing the data volume transmitted to the second device via the relay UE on the granularity; or
when the determination result is no, reselecting another relay UE to transmit the data to the second device through relay reselection.

12. The flow control method according to claim 8, wherein subsequent to performing the flow control operation in accordance with the first flow control message, the flow control method further comprises: receiving, by the first device, a second flow control message from the relay UE; and performing the flow control operation in accordance with the second flow control message.

13. The flow control method according to claim 8, wherein the first flow control message carries at least one granularity, and the performing the flowing control operation in accordance with the first flow control message further comprises performing the flow control operation on each granularity of the at least one granularity.

14. A relay User Equipment (UE) performing relay forwarding between a first device and a second device, comprising a memory, a processor, a transceiver, and a program instruction stored in the memory and executed by the processor,
wherein the processor is configured to execute the program instruction, so as to: generate a flow control message when a flow control condition has been met; and transmit the flow control message to the first device,
wherein the flow control condition comprises that relay data cached in the relay UE and transmitted by the first device to the second device exceeds a threshold, or that a flow control request message has been received from the first device,
wherein when the first device is the first remote UE and the second device is the network device, the flow control request message carries therein at least one of: (i) an Identity (ID) of the relay UE, (ii) an ID of the first remote UE, (iii) a granularity, or (iv) an ID of the flow control request message, and the flow control message carries therein at least one of: (u) the ID of the relay UE, (uu) the ID of the first remote UE, (uuu) the granularity, (uv) a data volume cached in the relay UE on the granularity, or (v) flow control operation indication information, wherein when the flow control request message carries therein the granularity, the relay UE further determines the granularity of the flow control message in accordance with the granularity carried in the flow control request message; or, wherein when the first device is the network device and the second device is the first remote UE, the flow control request message carries therein at least one of: (i) an ID of the relay UE, (ii) an ID of the first remote UE, (iii) a granularity, or (iv) an ID of the flow control request message, and the flow control message carries therein at least one of: (u) the ID of the relay UE, (uu) the ID of the first remote UE, (uuu) the granularity, (uv) a data volume cached in the relay UE on the granularity, or (v) flow control operation indication information, wherein when the flow control request message carries therein the granularity, the relay UE further determines the granularity of the flow control message in accordance with the granularity carried in the flow control request message; or, wherein when the first device is the second remote UE and the second device is a third remote UE, the flow control request message carries therein at least one of: (i) an ID of the relay UE, (ii) an ID of the second remote UE, (iii) an ID of the third remote UE, (iv) a granularity, or (v) an ID of the flow control request message, and the flow control message carries therein at least one of: (u) the ID of the relay UE, (uu) the ID of the second remote UE, (uuu) the ID of the third remote UE, (uv) the granularity, (v) a data volume cached in the relay UE on the granularity, or (vu) flow control operation indication information, wherein when the flow control request message carries therein the granularity, the relay UE further determines the granularity of the flow control message in accordance with the granularity carried in the flow control request message.

15. The relay UE according to claim 14, wherein the processor is further configured to execute the program instruction so as to: with respect to granularities, count a data volume of data cached in the relay UE and transmitted by the first device to the second device on each granularity, and determine at least one target granularity on which the data volume exceeds a corresponding threshold; and generate the flow control message with respect to the at least one target granularity.

16. A first device for transmitting data to a second device via a relay User Equipment (UE), comprising a memory, a processor, a transceiver, and a program instruction stored in the memory and executed by the processor,
wherein the processor is configured to execute the program instruction so as to realize the flow control method according to claim 8.

* * * * *